(12) United States Patent
Landman et al.

(10) Patent No.: US 10,675,783 B2
(45) Date of Patent: Jun. 9, 2020

(54) CONTAINER, PREFORM ASSEMBLY AND METHOD AND APPARATUS FOR FORMING CONTAINERS

(71) Applicant: HEINEKEN SUPPLY CHAIN B.V., Amsterdam (NL)

(72) Inventors: Bernardus Cornelis Johannes Landman, Boskoop (NL); Pieter Gerard Witte, The Hague (NL)

(73) Assignee: HEINEKEN SUPPLY CHAIN B.V., Amsterdam (NL)

( * ) Notice: Subject to any disclaimer, the term of this patent is extended or adjusted under 35 U.S.C. 154(b) by 298 days.

(21) Appl. No.: 15/486,029

(22) Filed: Apr. 12, 2017

(65) Prior Publication Data

US 2017/0217049 A1    Aug. 3, 2017

Related U.S. Application Data

(63) Continuation of application No. 13/382,108, filed as application No. PCT/NL2010/050419 on Jul. 2, 2010.

(30) Foreign Application Priority Data

Jul. 3, 2009  (NL) ...................... 2003132

(51) Int. Cl.
*B29B 11/08* (2006.01)
*B29C 49/06* (2006.01)
(Continued)

(52) U.S. Cl.
CPC .............. *B29B 11/14* (2013.01); *B29B 11/08* (2013.01); *B29C 49/06* (2013.01); *B29C 49/221* (2013.01); *B65D 1/023* (2013.01);

*B65D 1/0215* (2013.01); *B65D 1/0276* (2013.01); *B65D 23/02* (2013.01); *B29B 2911/1406* (2013.01); *B29B 2911/1412* (2013.01); *B29B 2911/1414* (2013.01);
(Continued)

(58) Field of Classification Search
CPC ...... B29C 49/06; B29C 49/221; B65D 1/0215
See application file for complete search history.

(56) References Cited

U.S. PATENT DOCUMENTS 4,079,851 A    3/1978 Valyi
4,569,869 A    2/1986 Kushida et al.
(Continued)

FOREIGN PATENT DOCUMENTS

EP    0759399 A1    2/1997
EP    1003686 A1    5/2000
(Continued)

OTHER PUBLICATIONS

Demirel, B. et al., "Crystallization Behavior of PET Materials," Bau Fen Bil. Enst. Dergisi Cilt, vol. 13, No. 1, 2011, pp. 26-35.
(Continued)

*Primary Examiner* — Andrew T Kirsch
(74) *Attorney, Agent, or Firm* — Pearne & Gordon LLP

(57) ABSTRACT

Preform assembly for blow moulding a container, comprising at least a first and a second perform, wherein the first perform is positioned inside the second perform before blow moulding the performs into the container, wherein each perform has a body forming portion having a wall thickness of less than about 8 millimetres, preferably less than about 6 mm.

50 Claims, 7 Drawing Sheets

Figure 3:
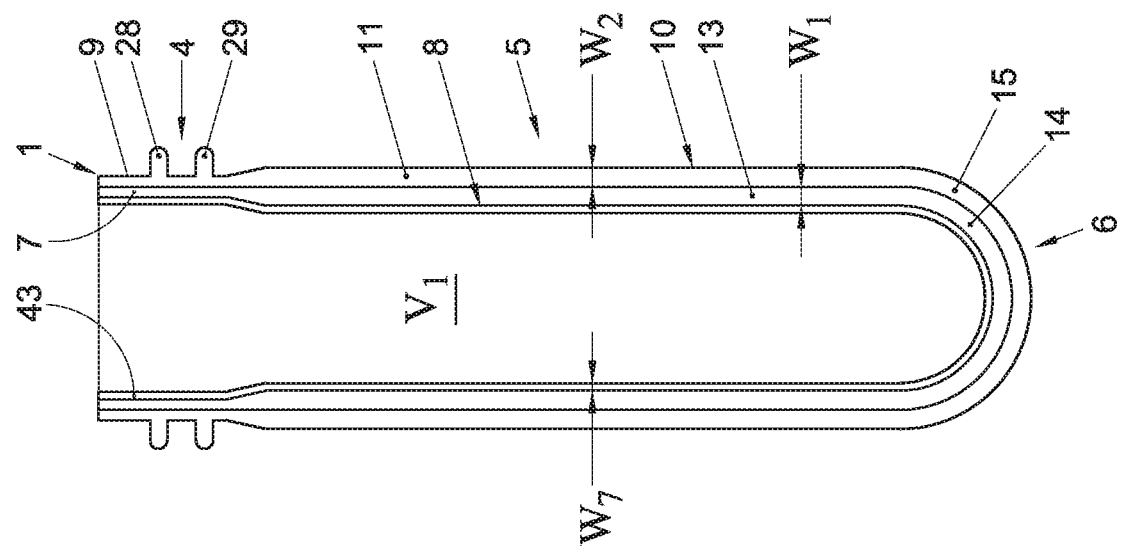

(51) Int. Cl.
    *B65D 1/02*      (2006.01)
    *B29B 11/14*      (2006.01)
    *B29C 49/22*      (2006.01)
    *B65D 23/02*      (2006.01)
    *B29K 67/00*      (2006.01)
    *B29K 105/00*      (2006.01)
    *B29L 31/00*      (2006.01)
    *B29K 69/00*      (2006.01)
    *B29K 23/00*      (2006.01)
    *B29C 65/08*      (2006.01)
    *B29K 77/00*      (2006.01)
    *B29K 27/06*      (2006.01)
    *B29K 25/00*      (2006.01)
    *B29C 65/00*      (2006.01)

(52) U.S. Cl.
    CPC .............. *B29B 2911/14053* (2013.01); *B29B 2911/14066* (2013.01); *B29B 2911/14093* (2013.01); *B29B 2911/14113* (2013.01); *B29B 2911/14326* (2013.01); *B29B 2911/14333* (2013.01); *B29B 2911/14666* (2013.01); *B29B 2911/14693* (2013.01); *B29B 2911/14713* (2013.01); *B29C 65/08* (2013.01); *B29C 66/5344* (2013.01); *B29C 66/545* (2013.01); *B29K 2023/06* (2013.01); *B29K 2023/12* (2013.01); *B29K 2025/00* (2013.01); *B29K 2027/06* (2013.01); *B29K 2067/00* (2013.01); *B29K 2067/003* (2013.01); *B29K 2067/006* (2013.01); *B29K 2069/00* (2013.01); *B29K 2077/00* (2013.01); *B29K 2105/258* (2013.01); *B29K 2995/0067* (2013.01); *B29K 2995/0089* (2013.01); *B29L 2031/7158* (2013.01); *Y10T 428/1352* (2015.01)

(56) References Cited

U.S. PATENT DOCUMENTS

| | | | |
|---|---|---|---|
| 5,035,931 A * | 7/1991 | Yamada | B29C 45/1643 215/42 |
| 5,242,085 A | 9/1993 | Richter et al. | |
| 5,301,838 A | 4/1994 | Schmidt et al. | |
| 5,332,121 A | 7/1994 | Schmidt et al. | |
| 5,407,629 A | 4/1995 | Schmidt et al. | |
| 5,647,495 A | 7/1997 | Orimoto et al. | |
| 5,676,267 A | 10/1997 | Slat et al. | |
| 6,266,943 B1 | 7/2001 | Nomoto et al. | |
| 6,375,048 B1 | 4/2002 | Van Der Meer et al. | |
| 6,391,408 B1 | 5/2002 | Hutchinson et al. | |
| 6,428,737 B1 | 8/2002 | Collette et al. | |
| 6,572,812 B2 | 6/2003 | Collette et al. | |
| 6,649,121 B1 | 11/2003 | Hamamoto et al. | |
| 6,676,883 B2 | 1/2004 | Hutchinson et al. | |
| 6,691,494 B2 | 2/2004 | Nomoto et al. | |
| 6,787,094 B2 | 9/2004 | Collette et al. | |
| 6,939,591 B2 | 9/2005 | Hutchinson et al. | |
| 7,055,719 B2 | 6/2006 | Nomoto et al. | |
| 7,150,902 B2 | 12/2006 | Farha | |
| 7,332,204 B2 | 2/2008 | Hutchinson et al. | |
| 7,615,176 B2 | 11/2009 | Collette et al. | |
| 8,028,857 B2 | 10/2011 | Rasmussen | |
| 8,118,183 B2 * | 2/2012 | Iwahashi | A61F 9/0008 215/12.2 |
| 8,579,142 B2 | 11/2013 | Vanhove et al. | |
| 9,555,572 B2 | 1/2017 | Van Hove et al. | |
| 2001/0027154 A1 | 10/2001 | Nomoto et al. | |
| 2001/0054779 A1 | 12/2001 | Collette et al. | |
| 2003/0001311 A1 | 1/2003 | Collette et al. | |
| 2003/0001315 A1 | 1/2003 | Hutchinson et al. | |
| 2003/0219555 A1 | 11/2003 | Hutchinson et al. | |
| 2004/0043169 A1 | 3/2004 | Subramanian et al. | |
| 2004/0112921 A1 | 6/2004 | Nomoto et al. | |
| 2004/0222223 A1 | 11/2004 | Swenson | |
| 2004/0256763 A1 | 12/2004 | Collette et al. | |
| 2005/0136201 A1 | 6/2005 | Farha et al. | |
| 2006/0006586 A1 | 1/2006 | Farha et al. | |
| 2006/0054635 A1 | 3/2006 | Iwahashi et al. | |
| 2006/0073294 A1 | 4/2006 | Hutchinson et al. | |
| 2006/0081554 A1 | 4/2006 | Snyder | |
| 2006/0148957 A1 | 7/2006 | Stewart et al. | |
| 2006/0283879 A1 | 12/2006 | Rasmussen | |
| 2008/0061476 A1 | 3/2008 | Hutchinson et al. | |
| 2008/0255280 A1 | 10/2008 | Sims et al. | |
| 2008/0257883 A1 | 10/2008 | Van Hove et al. | |
| 2008/0258356 A1 | 10/2008 | Van Hove et al. | |
| 2008/0290099 A1 | 11/2008 | MacDonald et al. | |
| 2010/0227089 A1 | 9/2010 | Van Hove et al. | |
| 2011/0024429 A1 | 2/2011 | Vanhove et al. | |
| 2011/0049193 A1 | 3/2011 | Muller et al. | |
| 2017/0136679 A1 | 5/2017 | Van Hove et al. | |

FOREIGN PATENT DOCUMENTS

| | | |
|---|---|---|
| EP | 1547768 A1 | 6/2005 |
| EP | 1626925 A2 | 2/2006 |
| EP | 2080709 A1 | 7/2009 |
| EP | 2152486 A1 | 2/2010 |
| GB | 2057962 A | 4/1981 |
| JP | 58187319 A | 11/1983 |
| JP | 6039906 A | 2/1994 |
| JP | 6345069 A | 12/1994 |
| JP | H10180853 A | 7/1998 |
| JP | H1134152 A | 2/1999 |
| JP | 2000062745 A | 2/2000 |
| NL | 1012802 C2 | 6/2000 |
| NL | 1012921 C2 | 6/2000 |
| NL | 1012922 C2 | 6/2000 |
| WO | 9108099 A1 | 6/1991 |
| WO | 9212926 A1 | 8/1992 |
| WO | 9702939 A1 | 1/1997 |
| WO | 9911563 A1 | 3/1999 |
| WO | 9920462 A2 | 4/1999 |
| WO | 2004099060 A2 | 11/2004 |
| WO | 2008048098 A1 | 4/2008 |
| WO | 2008090437 A2 | 7/2008 |
| WO | 2008127542 A1 | 10/2008 |
| WO | 2008129013 A1 | 10/2008 |
| ZA | 200104767 B | 9/2002 |

OTHER PUBLICATIONS

English translation of JP 6039906.

* cited by examiner

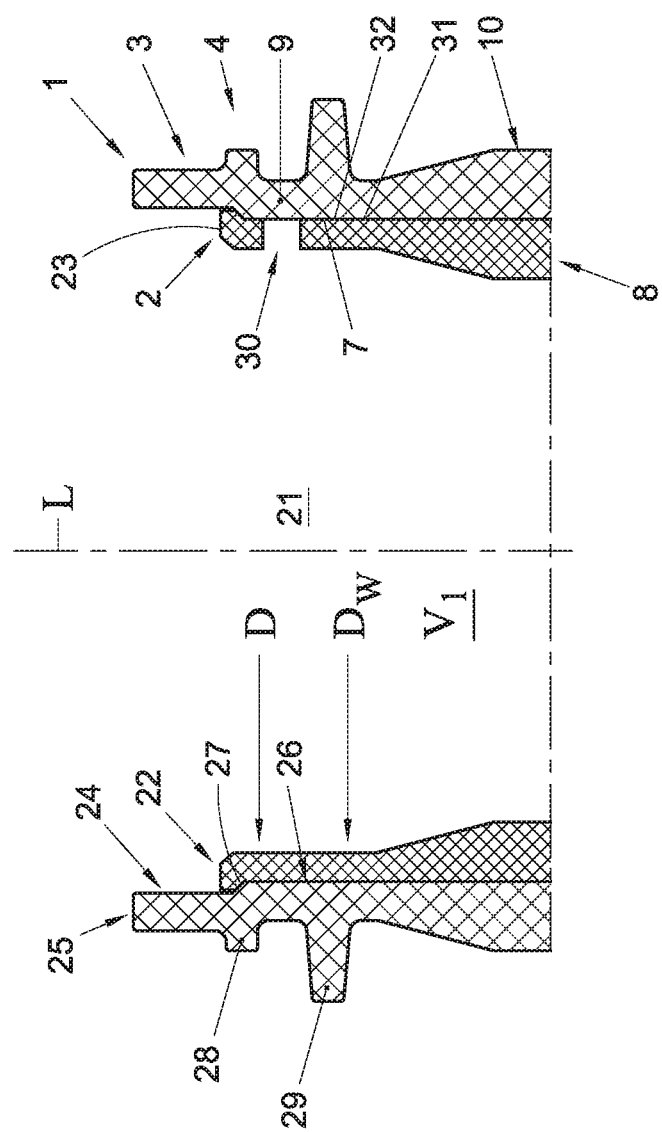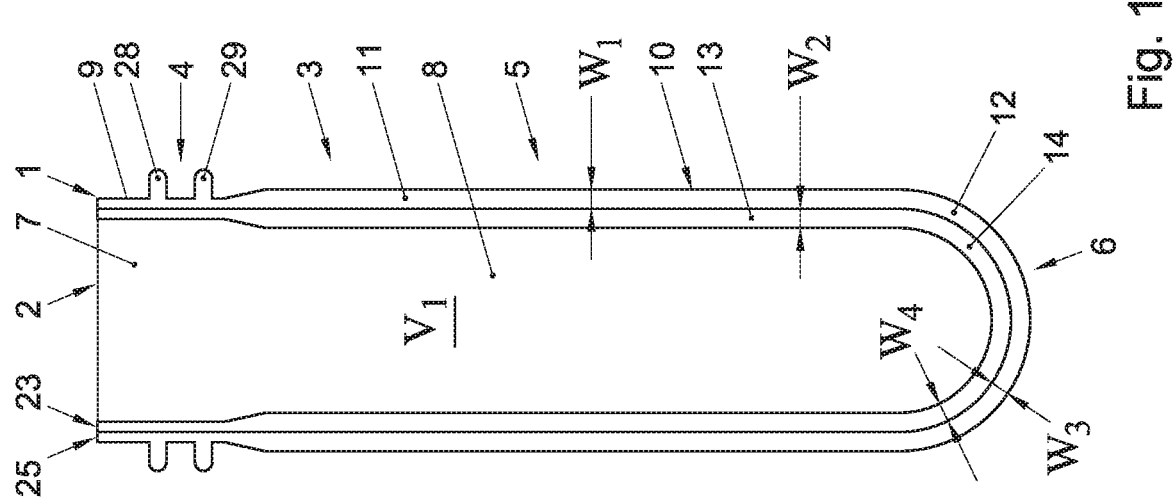

CONTAINER, PREFORM ASSEMBLY AND METHOD AND APPARATUS FOR FORMING CONTAINERS

The invention relates to a container and preform assembly for such container. The invention further relates to a method and apparatus for forming container. The invention relates especially to plastic blow moulded containers.

For forming plastic containers such as bottles it is a well known technique to blow mould, for example stretch blow mould a container from an injection moulded preform. Such preform comprises a neck portion comprising an opening in fluid communication with an interior space of the preform, and a body portion, containing said interior space, surrounded by a wall and bottom portion. During the blow moulding process the preform is heated and is placed inside a blow mould, after which a stretching rod is inserted into the preform and air is injected into the interior space, for stretching the wall and bottom portion, forcing them against the inside of the blow mould, bringing the container in the desired shape. Then the container is allowed to cool down, to retain that shape.

It is commonly known to blow mould a container from a mono material preform, leading to a mono material container, having the same material properties on the inside and the outside.

JP2000-062745 and JP06-345069 disclose methods for forming a container, in which a multi layer preform is injection moulded and subsequently blown into a multi layer container. An opening is provided in the outer layer of the preform, to the inner layer, such that in the container the inner layer can at least partly forced away from the outer layer in the neck area, to allow pressure balancing when the inner layer is deformed during use, for example when a product is dispensed from the inner space of the container. This means that the outer layer will remain or at least retain it original blow moulded shape during or after such dispensing.

EP1547768 discloses a method for forming a blow moulded container, in which a preform is injection moulded and subsequently part of the outside of the preform is provided with an outer layer of plastic, by a second moulding step. Then the preform is blown into a blow moulded, double layer container.

WO91/08099 discloses a method for forming a blow moulded container, wherein a first and second preform are injection moulded separately, where after the first, having a neck portion, is inserted into the inner space of the second preform, without a neck portion. The outer surface of the first preform below the neck portion lays against the inner surface of the second, outer preform. The two preforms are then blow moulded together into a multi layer bottle. In this document it is discussed that this can increase strength and impermeability of the blow moulded container and that it will increase efficiency and flexibility in the manufacturing process. This method is described as especially useful for containers having a content of between 1.5 and 3 litres.

WO92/012926 discloses a multi layer bottle, having a delaminating inner layer, blow moulded from a multi layer preform. An opening is provided near the bottom portion of the container, through the outer layer, such that air can be introduced through the opening, forcing the delamination of the inner layer. This means that the content of the container can be pressurised without the air coming into contact with the contents.

The present invention has as an object to provide alternatives for the above mentioned containers and methods for forming containers.

The present invention has as a further or alternative object to provide containers which, in blow moulded state, have a content of more than three litres, such as but not limited to more than 5 litres, such as for example between 8 and 40 litres, such as 10, 20 or 30 litres.

The present invention has as a further or alternative object to provide containers which are coloured and/or comprise a scavenger for limiting or preventing gas migration through the wall of a container and/or scavenger oxygen and/or components of air.

A preform assembly according to the description can be characterised by at least a first and a second preform, wherein the first preform is positioned inside the second preform before blow moulding the preforms into the container. Each of the preforms is substantially amorf, preferably entirely amorf. Each of the first and second preform preferably has a body forming portion with a wall thickness of less than about 8 millimetres, preferably less than about 6 mm.

A container according to the description can be characterized by having been blow moulded from a preform assembly comprising a first preform in a second preform. A first layer of the container can be formed from the first preform and a second layer, outside the first layer, can be formed from the second preform. The plastics material of the first preform can have been stretched further for forming the first layer than the plastics material of the second preform for forming second layer.

A method for forming a preform assembly for blow moulding a container according to the description can be characterized by injection moulding a first preform and injection moulding a second preform, both with a substantially and preferably entirely amorphous structure. The preforms preferably have a wall thickness of less than about 8 mm, preferably less then about 6 mm, wherein the first preform is inserted into the second preform and/or the second preform is provided over the first preform.

An apparatus for providing a preform assembly can be characterized by comprising at least one first mould cavity for forming a first preform and at least one second mould cavity for forming a second preform. The apparatus can further comprise at least one transfer device for moving a first preform into a second preform and/or a second preform over a first preform.

Figure 2:
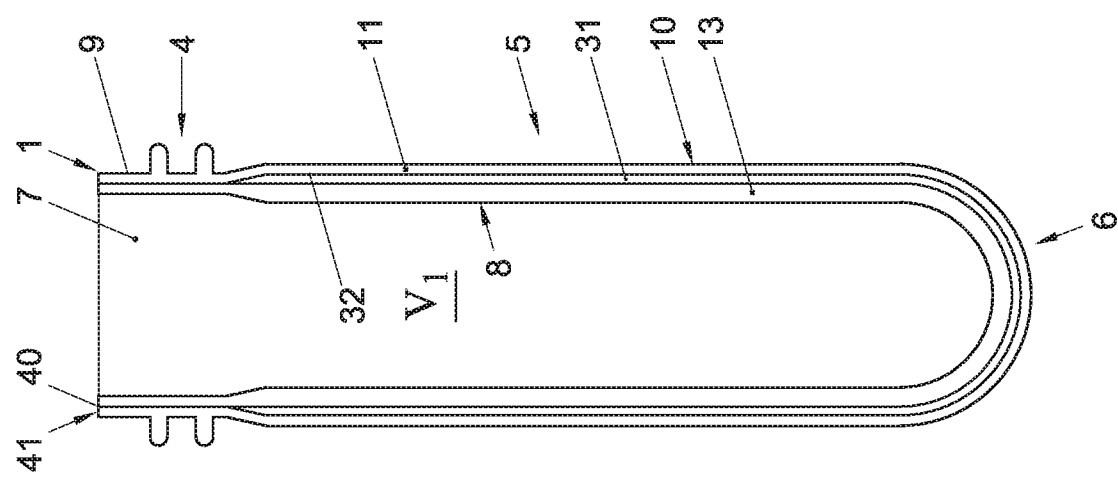
Figure 4:
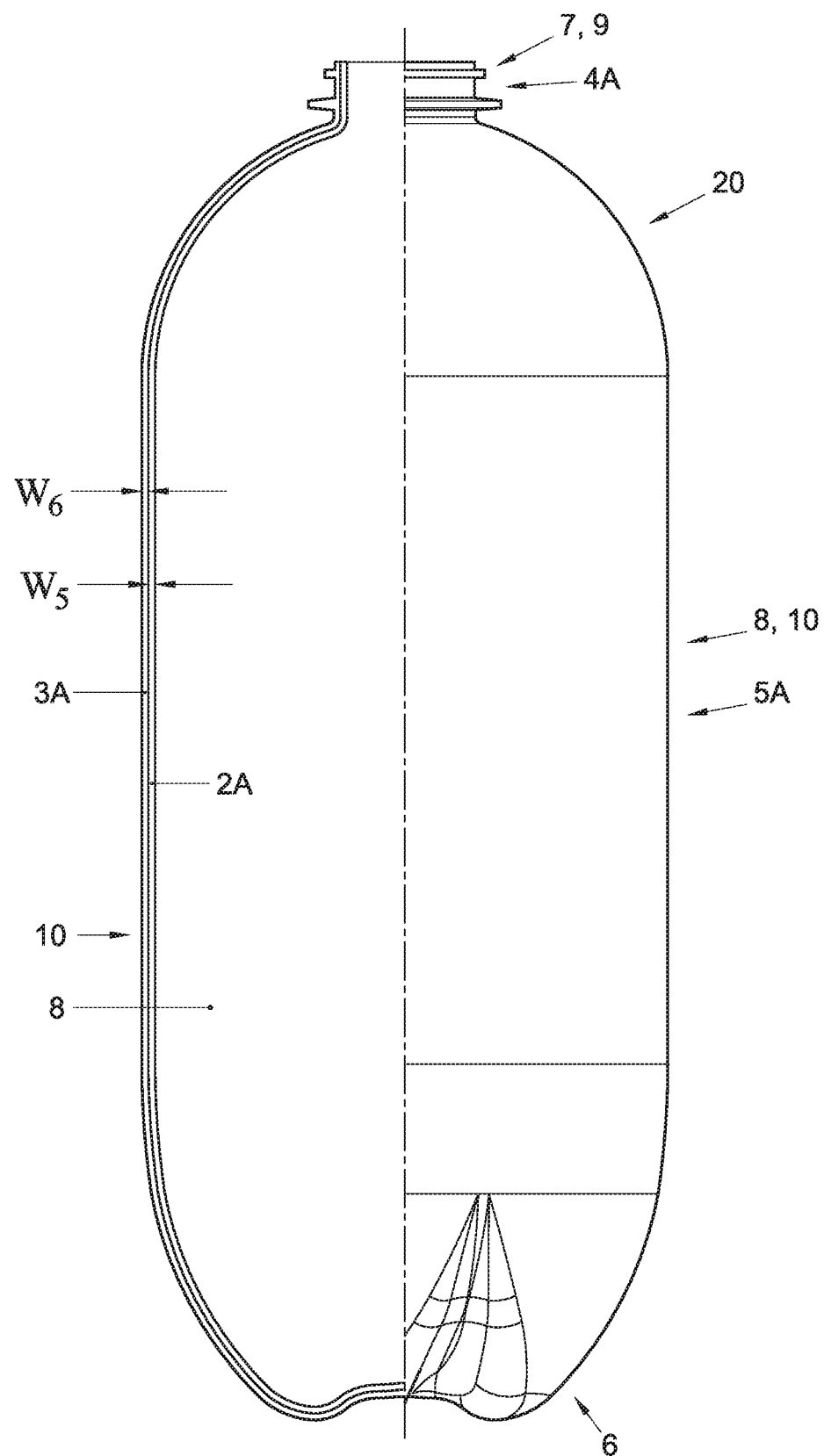
Figure 5:
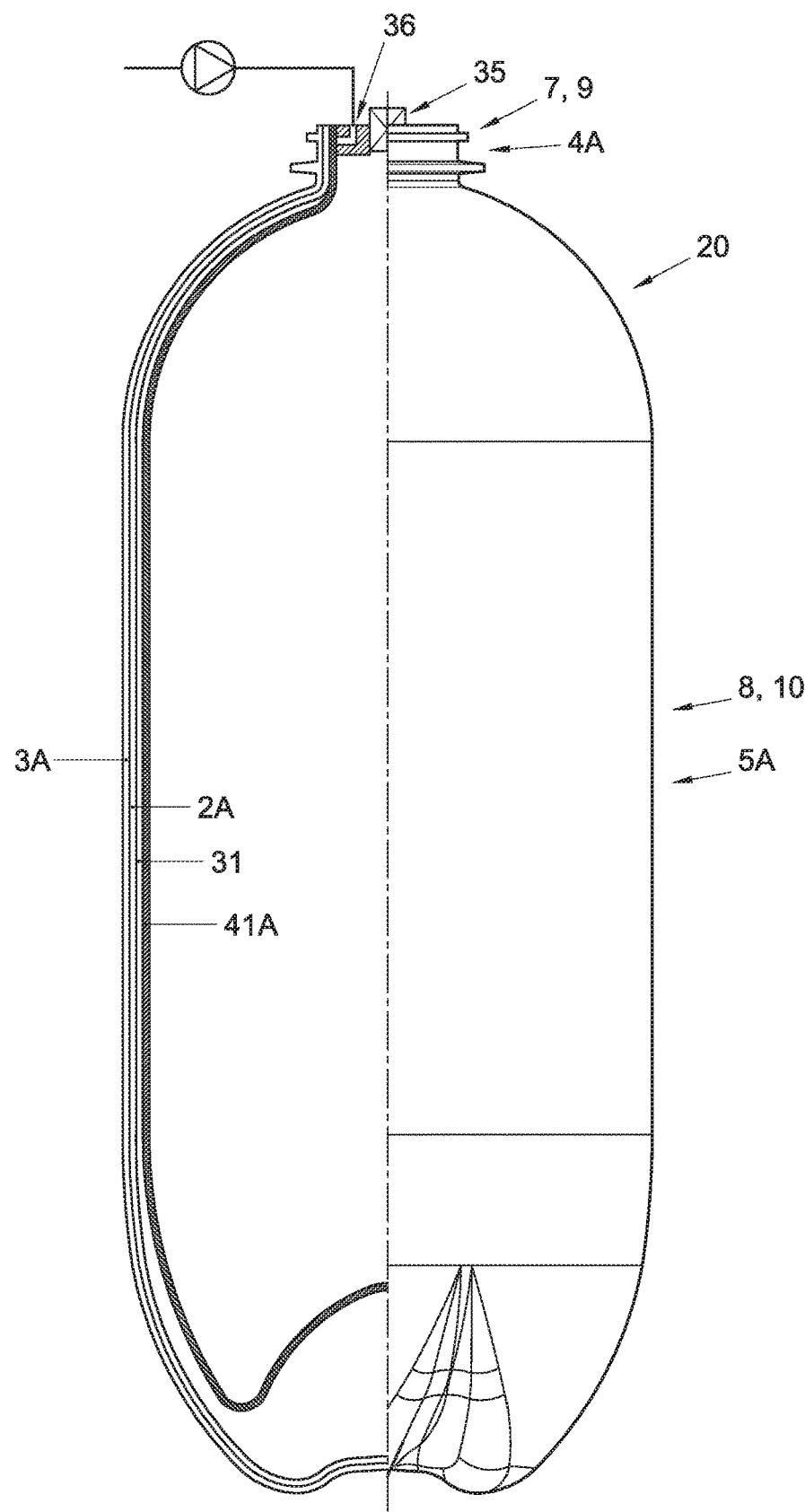
Figure 6:
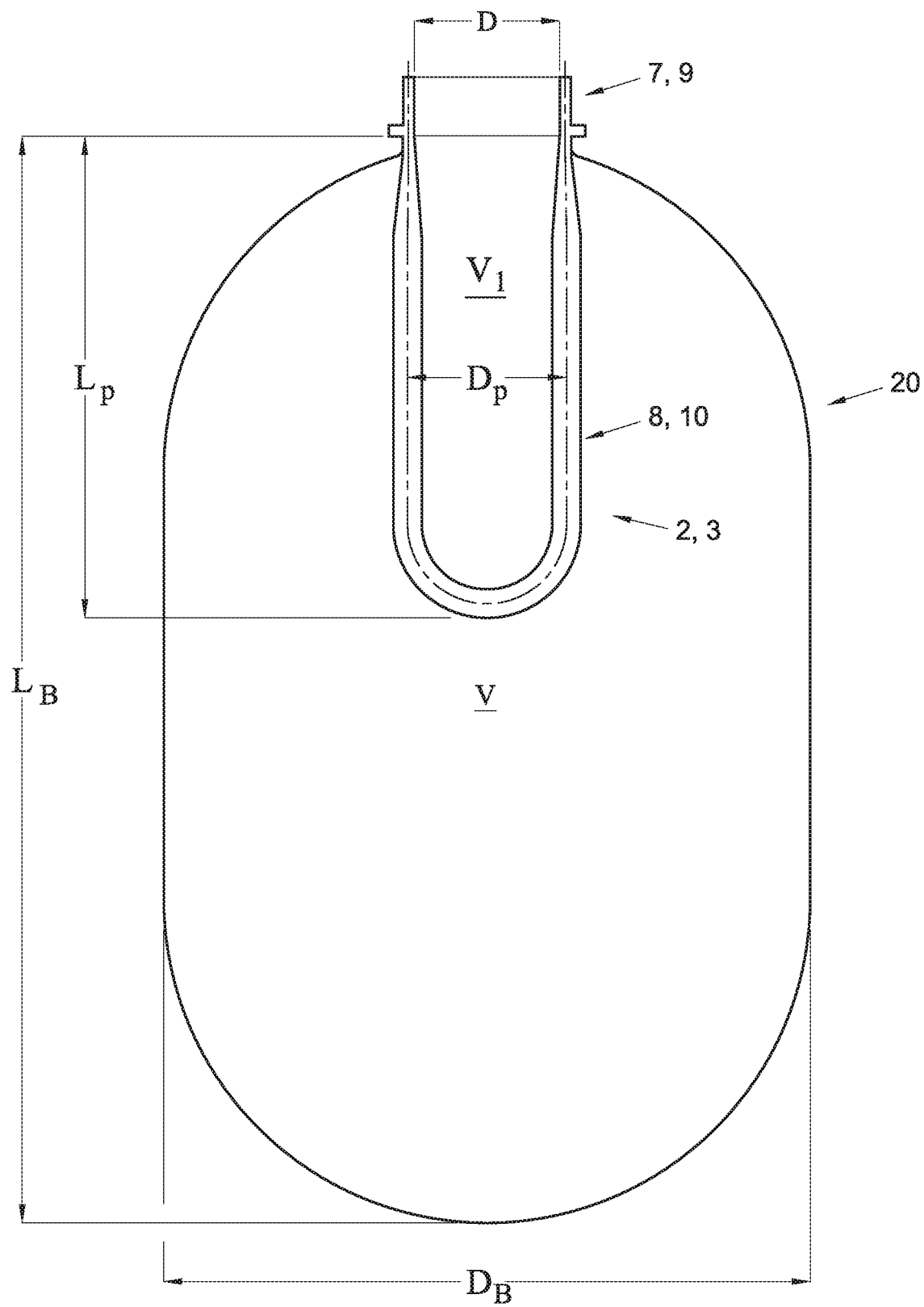
Figure 7:
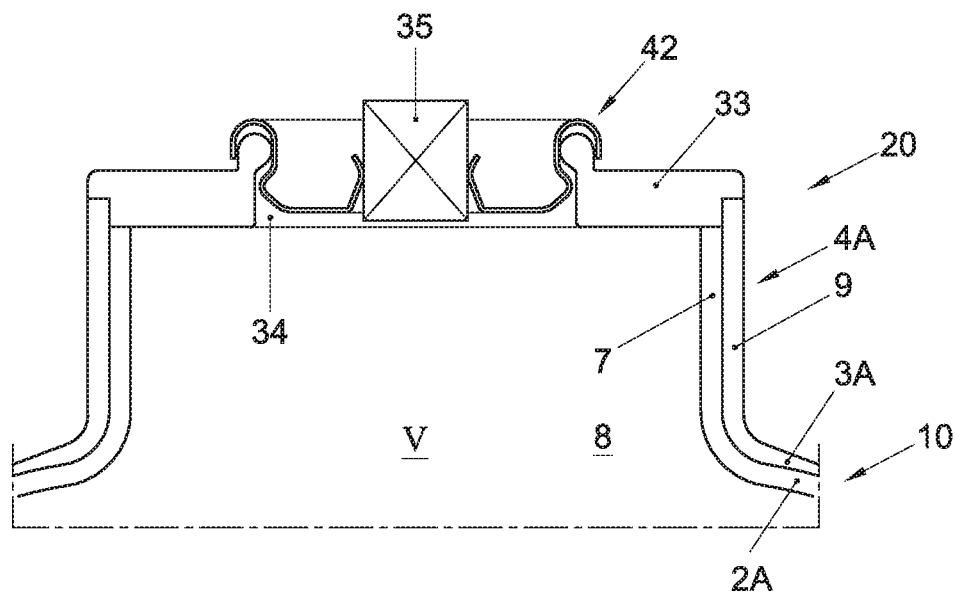
Figure 8:
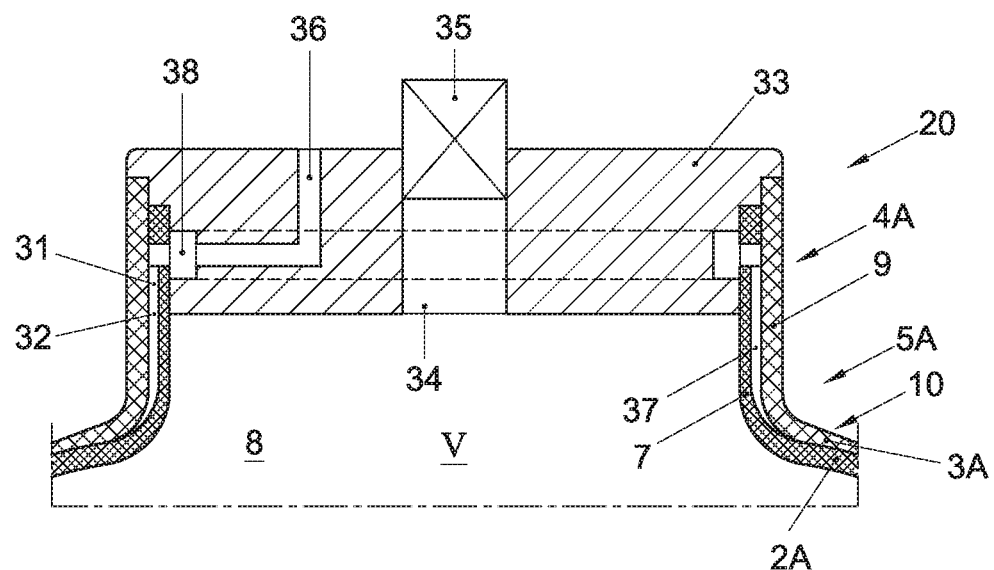
Figure 8A:
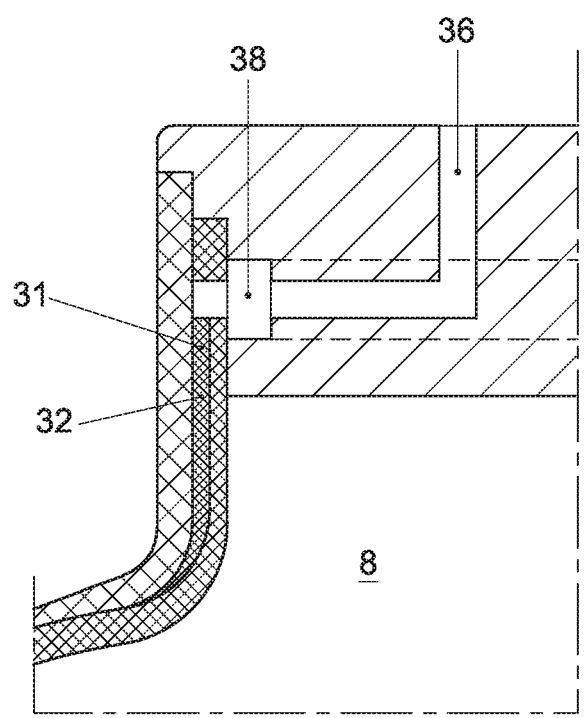

Some further advantageous embodiments of a preform assembly, container, method and apparatus are described in the further claims. Some embodiments will be described hereafter in relation to the drawings, by way of example only and which should by no means be understood as limiting the scope of the invention as claimed in any way. Herein shows:

FIG. 1 schematically in cross section a preform assembly in a first embodiment;

FIG. 1A schematically a detail of the neck area of a preform assembly;

FIG. 2 schematically in cross section a preform assembly in a second embodiment;

FIG. 3 schematically in cross section a preform assembly in a third embodiment;

FIG. 4 schematically and partially in cross section a container, in a first embodiment;

FIG. 5 schematically and partially in cross section a container, in a second embodiment;

FIG. 6 schematically preform assembly and container;

FIG. 7 schematically a neck portion of a container with a closure, in a first embodiment;

FIG. 8 schematically a neck portion of a container with a closure, in a second embodiment; and FIG. 8A is a fragmentary schematic view of the left-hand portion of FIG. 8 on an enlarged scale showing a spacer.

In this description and the drawings the same or corresponding elements have the same or corresponding reference signs. The embodiments shown and/or described are given by way of example only and are not to be considered limiting in any way. Many variations are possible within the scope of the present disclosure, which variations of for example parts of or combinations of parts of the embodiments shown also are considered to have been disclosed.

In this description blow moulding has to be understood as at least comprising but not limited to stretch blow moulding, wherein a preform is heated, stretched lengthwise and blown into a desired shape. During lengthwise stretching the preform can already be blown to some extend.

In this description a preform, which can also be a parison, has to be understood as at least including but not limited to an element injection moulded from plastic, to be blown into a blow moulded container. In this description preforms shall be described for blow moulding containers which basically have a bottle shape, including a neck portion, a body portion and a bottom portion, but it will be obvious to any skilled person that different shapes of containers can be made using different shapes of preforms falling within the same inventive concept. A preform can be single or multi layer. A multi layer preform can be manufactured using well known techniques, such as but not limited to co-injection, co-extrusion or over moulding. A multi layer preform can have a delaminating layer or layers.

In this description wording like about and substantially should be understood as meaning that variations of a given value it refers to are allowable within the given definition, which variations can at least be 5%, preferably at least 10% and more preferably at least 15% of the given value.

In this description preforms and containers will be discussed made of PET or PET blends. However, preforms and containers according to the present disclosure could also be made of different materials, blends or combinations of materials, such as but not limited to polypropylene or polystyrene, PEN, polyethylene, Polycarbonate, PBT, blends of the forgoing or combinations thereof. In case of PET or PET blends, standard PET has to be understood in this respect as at least including PET without added additives for preventing crystallisation of the PET during forming such as injection moulding of a preform.

In this description reference shall be made to containers for holding and dispensing beverages, especially carbonated beverages such as beer and soft drinks. However other contents can be stored and dispensed using a container according to this description.

In the present disclosure preforms can be formed of a plastic material that can be stretch blow moulded into a container having a relatively thin wall or combination of walls, wherein the preform is substantially amorf, whereas the bottle is at least partly crystalline. Preferably the preform is formed of a material substantially free of crystallisation preventing additives, such as glycol or co-monomers as isophtalic acid or cyclohexanedimethanol. It has been recognised that such additives can be favourable in injection moulding a preform substantially amorf, but these additives remain in the blown container, which is detrimental to the strength and/or stiffness of the container. The preforms are preferably injection moulded having a wall thickness sufficiently small to substantially prevent crystallisation of the plastic material.

In this description stretch blow molding is described for forming containers from preform assemblies. These containers are preferably blow molded at a temperature just above the glass transition temperature of the plastics material. More preferably the plastics material is conditioned, stretched and orientated just above the glass transition temperature of the plastics material.

In a container according to this description in the plastics material can have a degree of crystallization. In embodiments the preforms of a preform assembly can be stretch blow molded such that they obtain a different degree of crystallization. This effect can be obtained by stretching the plastics material of the different preforms to a different ratio, especially to a different axial ratio, hoop ration and/or blow up ratio, by stretching and blow molding at different temperatures, by influencing the cooling temperatures of the different preforms or by combinations thereof. In other embodiments different preforms of the assembly can be made of different materials or blends.

In all embodiments disclosed or described an axial length of an inner preform can be smaller than the axial length of the outer container and/or an diameter of the inner preform can be smaller than the inner diameter of the outer container, such that adjacent parts of the preforms can be spaced apart, allowing the inner container to be stretched and/or blown either axially or diametrically or in both direction before the outer container is directly or indirectly engaged thereby and is stretched and/or blow molded too.

In a container according to the description there are preferably at least an inner container and an outer container, the inner container formed from an inner preform, the outer container formed from an outer preform. Inner has to be understood as at least meaning extending substantially within the outer preform or container, and does not necessarily refer to an innermost preform or container. Preferably at least one of and more preferably both the outer and inner container have areas of crystallization connected by amorphous portions. In an embodiment the outer container can have a lower degree of crystallization than the inner container, such that the inner container is stronger and the outer container is more impact resistant. The outer container can for example have a crystallization rate of between 14 and 22% of the material, preferably measured by volume, whereas the inner container can for example have a higher rate of crystallization, for example between 22 and 35% or higher, such as between 28 and 32%, wherein higher degrees are preferred. This can for example be obtained by increasing the temperature of the inner preform or by stretch blow molding to a higher ratio.

In embodiments of containers according to this description a part of at least the wall of a body forming portion and/or of the bottom forming portion of an inner or outer container can be made thicker than the further parts of the same body forming portion or bottom forming portion. Surprisingly it has been recognized that such areas in stretch blow molded containers, especially in crystallizing materials, form weak areas of the containers which can be exploited to provide designated failure areas in the container. This has to be understood as meaning at least that if for example the internal pressure in the container is becoming higher than a desired maximum value or if the container is pierced, resulting in sudden pressure changes, the container will fail mainly or entirely in at least one of these designated failure areas. This can increase user safety further.

In FIGS. 1-3 schematically a preform assembly 1 is shown, comprising a first preform 2, positioned inside a second preform 3. The first and second preforms 2, 3 can be injection moulded separately, in single or multi cavity moulds, where after the first preform 2 can be inserted into the second preform 3, by relative movement of the preforms 2, 3. In the embodiments shown the preform assembly has a neck 4 and a body 5 extending from the neck 4, closed at the end opposite the neck 4 by a bottom 6 as part of the body 5. In the embodiment shown the first preform 2 comprises a neck portion 7 and a body forming portion 8. The second preform also comprises a neck portion 9 and a body forming portion 10. In the position as shown in FIG. 1 the body forming portion 8 of the first preform 2 extends inside the body forming portion 10 of the second preform 3, whereas the neck portion 7 of the first preform 2 extends substantially within the neck portion 9 of the second preform 3.

The body forming portion 8 of the first preform 2 can have a wall 11, extending at least between the neck portion 7 and a bottom forming portion 12 of the first preform 2, which has a thickness $W_1$ of less than about 8 millimetres. The wall thickness $W_1$ of the wall 11 can be less than about 6 millimetres. The body forming portion 10 of the second preform 3 can have a wall 13, extending at least between the neck portion 9 and a bottom forming portion 14 of the second preform 3, which has a thickness $W_2$ of less than about 8 millimetres. The wall thickness $W_2$ of the wall 13 can be less than about 6 millimetres. The wall thickness $W_1$ of the first preform 2 can be smaller than the wall thickness $W_2$ of the second preform 3, or vice versa. In another embodiment the wall thicknesses $W_1$ and $W_2$ can be about the same. The wall thicknesses $W_{3,4}$ of the bottom forming portions 12, 14 of the first and second preforms 2, 3, can be smaller than the thicknesses $W_1$, $W_2$ of the walls 11, 13 connected thereto. In another embodiment the thicknesses can be similar or bigger.

When a container 20 is blow moulded from the preform assembly 1 of for example FIG. 1 or 2 the container 20 will, as shown in FIG. 4, have an inner layer 2A, formed from the first preform 2, and an outer layer 3A, formed from the second preform 3; the container 20 will also have a neck 4A. The layers 2A, 3A shall, in the body portion 5A of the container 20, have thicknesses $W_5$, $W_6$ respectively, defined mainly by the original wall thicknesses $W_1$, $W_2$ of the preforms 2, 3 respectively, and the extend to which the preforms are stretched. In an advantageous embodiment during blow moulding the container 20 the body forming portion 8 of the first preform 2 will be stretched further, that is to a higher extend than the body portion 10 of the second preform 3. In an embodiment this is done such that the inner layer 2A shall be stronger but more brittle than the second, outer layer 3A, which will be less stiff but more ductile. In an other embodiment the preforms 2, 3 can be substantially evenly stretched, resulting in similar material properties. In another embodiment the preforms can be heated to and/or blow molded at different temperatures, influencing crystallization. Combinations of these embodiments are also possible.

For blow moulding container of a size above 3 litres, especially above 5 litres, such as containers for carbonated beverages having a volume of about 10 litres or more, using a single preform, a preform normally will have a wall thickness of more than about 6 to 8 mm. By reducing the wall thickness $W_1$, $W_2$ of the preforms 2, 3, especially below about 8 mm, more preferably close to or below 6 mm, the cycle time for injection moulding the preforms will be reduced significantly over single preforms for blow moulding the same sized and dimensioned containers. Moreover, better mechanical properties can be obtained, whereas for example permeability for gasses such as $O_2$ and $CO_2$ can be optimized. As indicated additives can be added to the different preforms, such that they do not interfere with each other or with the materials used for the preforms, which materials may be different or the same for the preforms 2, 3.

It has been recognised here that by injection moulding the preforms from a plastic prone to crystallisation, such as PET, by reducing the wall thicknesses of the preforms 2, 3 to around or below 8 mm, preferably to around or below 6 mm, at least for the parts to be stretched later on, crystallisation of the plastic material in the preform can easily be prevented substantially or preferably entirely, even with standard PET, whereas the preform can be stretched to such extend that crystallisation in the container wall can be obtained. This can obviate the need for using more expensive and more difficult to handle grades of plastic. Moreover, using standard grades of plastics such as but not limited to PET can have the advantage that the plastic, especially a container blow moulded therefore will have better mechanical properties and especially will be less prone to creep. By having to use no or substantially no crystallisation preventing additives in the plastic, such as glycol or other such additives known in the art, the preform can be stretch blow moulded into a relatively strong and/or stiff and/or rigid container, because said additives will not be present in the container. An optimal stretch ratio can be obtained, resulting in a light and strong container. For as far as the container is blow moulded from one preform this can have specific mechanical properties, whereas the part of the container blow moulded out of another of the preforms in the preform assembly, the latter can be made for example more pliable, more flexible, more shock absorbing or otherwise have different mechanical and/or chemical properties.

By using different preforms assembled and stretch blow moulded into one container, the preforms can be optimised, for example for heat transferring and heat absorbing properties. By amending for example the colouring of one of the preforms compared to the or each other preforms, the heating of the preforms can be optimized. For example an inner preform can be made darker than the outer preform, resulting in the advantage that when the preforms are heated together from an outside of the preforms, the heat will be better absorbed by the inner preform than by the outer preform. Since the inner preform will be further away from the heating source than the outer preform, this will lead to a further optimized heating, especially a more even heating of the preforms. Alternatively or next to the colour differences between the preforms, the adjacent surfaces of the preforms can be optimized, for example by amending the roughness of the surfaces, to influence heat transfer from the outer preform to the inner preform or vice versa by amending the interface between the preforms. Obviously since the neck portions of the preforms will substantially not be deformed during blow moulding, the above is especially relevant for the parts of the preform(s) that will be heated and stretched.

In an embodiment the outer preform 3 can be made of a highly impact resistant polymer, stretch blow moldable material, preferably a material having an impact resistance of more than 250 according to the standard Notched Izod Impact Test. Such material can for example be but is not limited to modified Nylon, toughened Nylon 6,6, blends of polycarbonate, impact modified PBT and impact modified PBT/PET. Such impact resistant materials will provide an outer container which can prevent to a high degree the container 20 from exploding uncontrollably when for example pierced. In another embodiment at least one of the first and second preform or container can be provided with an integral layer of such high impact material.

In this description a wall thickness W has to be understood as an average thickness of a wall or relevant part thereof. Preferably the thickness of the walls of body forming portions of preforms 2, 3, except possibly for the bottom forming portions and possibly an area 15 near the transition of the neck portion to the body forming portion, is substantially constant or has a substantially smooth course.

As is shown in more detail in FIG. 1A, the neck portion 7 of the first preform 2 can have an outward reaching flange 22 near or at a free edge 23 thereof, whereas the neck portion 9 of the second preform 3 can have a first portion 24 near the free edge 25 thereof and a second portion 26 between said first portion 24 and the body forming portion 10. The first portion 24 is slightly wider than the second portion 26, such that the flange 22 can abut the transition 27 between the first and second portions 24, 26, and cannot pass the second portion 26. Thus the first preform 2 is again prevented from being inserted further into the second preform 3, whereas when a container 20 is blown there from the second portion 26 of the second preform 3 will extend and be enclosed between the flange 22 and the body forming portion 8 of the inner layer 2A of the wall, such that the inner layer 2A is kept in position relative to the outer layer 3A mechanically, even if no adherence or other connecting means between said layers 2A, 3A is present. Obviously other means can be provided for locking the first preform relative to the second preform.

In an embodiment the neck portion 9 of the second preform 3 can have at least one and preferably two flanges extending outward. In an embodiment two flanges 28, 29 can be provided, extending substantially parallel to each other. In an embodiment one flange 28 can extend at or near a level of the transition 27 between the first and second portion 24, 26, such that this flange can aid to shape retaining of the relevant part of the neck 4, thus further preventing the inner layer or preform 2 to come loose from the outer layer or preform 3. In an embodiment another flange 29 can be provided between the first flange 28 and the body 5 and can be used for example but not limited to for engagement during transfer of the preform 3 or preform assembly, during transport of the assembly, during blow moulding, during filling and for attachment of a cap, lid, valve assembly, dispensing device or other means. This flange can also aid in shape retention of the neck 4. In an embodiment the flange 29 can extend further outward than the first flange 28.

A preform assembly 1 can be made of PET or PET blends. In an embodiment the first preform 2 can be made of virgin plastic material or at least a food or beverage grade plastic material. In an embodiment the second preform 3 can be made of recycled plastic material. In an embodiment an additive can be provided in the plastic material for influencing, especially reducing migration of gas through the wall of the container, such as but not limited to for example an $O_2$ or $CO_2$ barrier. In an embodiment one of the first and second preforms 2, 3 can comprise a barrier material scavenger, for gas migrating into or through the plastic material. The barrier material can be or contain a scavenger, such as an $O_2$ scavenger. In an alternative embodiment the barrier material or scavenger can be for a different gas, such as but not limited to $CO_2$. A gas migration limiting or preventing additive and/or a scavenger can have the benefit that for example oxidation of the content of a container 20 blown from the preform assembly 1 can be prevented or at least limited. In an embodiment one of the first and second preforms 2, 3 can comprise a colorant, such as but not limited to green, brown, blue, yellow or red. Colouring of the preform 2, 3 and thus of a container 20 to be formed therewith can have the advantage of shielding contents of the container and/or the container itself against deterioration or at least influence of the content by for example radiation. In an embodiment the first preform 2 can comprise the gas migration limiting or preventing additive and/or the scavenger, whereas the gas migration limiting or preventing additive and/or the scavenger and the colorant are preferably not provided in the same preform. An advantage of adding a gas migration limiting or preventing additive and/or a scavenger to one of the preforms only can be that less of the additive and/or scavenger is necessary in the preform assembly 1, reducing the cost of the relatively expensive additives and/or scavengers. Preferably at least about 3% in weight of scavenger is added to the plastics material. Such scavenger can for example be an oxygen scavenger or a CO2 scavenger. Obviously other materials or blends can be used, such as but not limited to PVC, PP or PAN.

In an embodiment the first preform 2 can be provided with at least one and preferably several openings 30 in the neck forming portion, extending there through. The opening or openings 30 can be provided below a free edge 23 of the first preform 2. In an embodiment having a first flange 28 the or each opening 30 can be provided at a level at or just below the first flange. In an embodiment having a transition 27, the or each opening can be provided just below said transition 27. In an embodiment having at least two flanges 28, 29, the or each opening 30 can be provided at a level between the first and second flange 28, 29. Openings 30 can be provided at different levels. The or each opening opens at one side into an interior $V_1$ of the preform assembly 1 and thus into an interior space V of a bottle 20 blown there from. At the opposite side the or each opening 30 can open into a space 31 between the neck forming portion 7 of the first preform 2 and the neck forming portion 9 of the second preform 3. The space 31 can be provided with spacers 32, such as ribs, notches or other elements extending between part of the neck forming portions 7, 9 below the free edge 23. These spacers can have the advantage that they keep at least part of the outside of the neck portion 7 of the first preform spaced from at least part of the second preform 3, at least the inner surface thereof. In a preferred embodiment the spacers 32 can extend into a shoulder forming portion of the preform assembly 1. This results in space between an inner and outer wall in the shoulder portion of the container blow moulded from the preform assembly 1. This can have the advantage that a pressure fluid, especially a pressure gas can be brought easier between an inner and outer wall portion of the body of the container 20, which can result in a more even pressure build up, advantageous to a homogenous dispensing pattern of the beverage from the container 20.

A lid 33 can be provided in and/or on the container 20, as shown schematically in FIG. 7. The lid can be provided in any suitable manner, such as for example but not limited to welding, such as but not limited to ultrasonic welding, clinching, press fit, screw threads, bayonet closure, gluing or other suitable means. The lid 33 closes off the internal volume of the container 20. A dispense opening 34 is provided in the lid 33. In an embodiment a valve 35 can be provided in the dispense opening, which can be a known beverage valve such as but not limited to a beer valve. In the embodiment shown the valve 35 is provided in and over the opening 34 by a clinch connection 42, wherein the opening 34 is larger than the clinch plate of the clinch connection. This can provide for the possibility of providing the lid 33 prior to blow moulding the preforms into a container, whereas the clinch connection can be made after filling the container through the opening 34. In another embodiment the valve 35 can be provided in a different manner, for example by welding, screwing, pressfit, and/or by providing a plastic valve assembly, which can for example be partly or entirely made integrally with the lid 33. Preferably with a preform assembly 1 according to the description the preform assemblies are blow moulded in line with a filling and closure apparatus, reducing transport and storage volumes considerably. In an embodiment the valve 35 can be a spray can type valve, for example a male or female type of spray can type valve. Such valves are well known in the art. Examples of such valves are described for beverage containers in NL1012802, 1012921 and NL1012922, herein incorporated by reference. In such embodiment a pressure regulating device, for example as described in the above referenced and incorporated patents, can be provided inside the container, especially within the beverage or between an inner and outer wall part of the container, for maintaining an internal pressure in the container. When using the container for a carbonated beverage the internal pressure is then preferably maintained at an equilibrium pressure for $CO_2$ in the beverage. In another embodiment a spray can type valve can be used suitable for both introducing a gas into the container and dispensing a beverage from the container. Such valve is for example known from WO 2008/048098.

When for example a compressor or pump is provided for pressurising the container 20, for example by pressing a fluid into the inner volume V of the container or into a space between the walls of the container 20, it is preferred that the same compressor or pump can be used to pump, especially such the fluid from the container 20, preferably such that the container collapses at least to some extend, especially such that the overall volume of the container is reduced significantly. This can for example be achieved by a compressor or pump which is reversible.

In another embodiment the container 20 can be a compressible container 20, meaning that at least the body 5A of the container 20 can be compressed by exerting an external pressure on the body 5A, for example by inserting the container into a pressure chamber, such as for example but not limited to a pressure chamber known from EP1003686 or EP1626925. By pressurising the container 20 or at least the body thereof the beverage can be dispensed from the container, preferably at substantially an equilibrium pressure such as an equilibrium of $CO_2$ contained in the beverage. In such embodiment only a dispense opening 34 and/or a valve 35 have to be provided for.

When one or more openings 30 are provided in the neck portion 7 as discussed here above, for example on an inner or outer side thereof, a pressure fluid supply opening 36 can be provided in the lid, in fluid communication with at least one of the opening(s) 30. In the embodiment as shown schematically in FIG. 8 a circumferential groove 38 is provided in the lid, open to the inner surface of the neck portion 7, to which groove 38 the supply opening opens. The groove 38 is sealed against the inner side 37 of the neck portion 7, 9 such that a pressure fluid cannot flow from the groove 38 into the internal volume V of the container 20. Pressure fluid supplied through the opening 37 thus flows through the groove 38 into at least one of the openings 30 and into the space 31 or at least between the neck portions 7, 9 of the preforms 2, 3. From there the pressure fluid can then flow between the layers of the wall of the body of the container, pressing the inner layer 2A away from the outer layer 3A in the body 5A of the container 20. This will pressurise the inner layer and thus the beverage contained therein, forcing the beverage through the dispense opening 34 in the lid 33.

In a further embodiment, not shown, a tapping rod or tap spear can be inserted into the opening. Such tap spear or tapping rod is well known in the art, for example from beer barrels. One type is a tap spear having a Sankey two or three lug valve assembly which can be mounted in or on the neck 4 of the container 20. Another well known type of tap spear has a flat head valve assembly, which can be mounted in and/or on the neck of the container. Such tapping rod or tap spear has a gas supply valve and a beverage dispensing valve, which can be operated by a tapping head. In an embodiment the gas valve can open into the inner volume V of the container, especially within the inner layer 2A, for pressurising directly the beverage therein. In another embodiment the gas valve can open into one or more opening 30, for pressurising the inner layer 2A from the space 31 between the inner and outer layer 2A, 3A. Thus the beverage can be pressurised indirectly, without the pressure gas coming into contact with the beverage. Instead of a pressure gas a pressure fluid such as water can be used in that case. In an embodiment as a pressure gas air is used, fed into said space 31. In such embodiment preferably an $O_2$ scavenger is provided in the plastic material of the inner layer 2A and/or in the space 31, for preventing or at least reducing the risk of oxidation of the beverage by $O_2$ migrating through the inner layer 2A. In an alternative embodiment instead of or next to a scavenger a plastic material can be used for the inner layer having a high $O_2$ barrier and/or a protective film or layer of such material can be provided on the surface of the first preform 2 and/or in the space 31.

A preform assembly 1 of any one of the embodiments shown can be shaped and dimensioned for blow moulding a plastic container 20, as schematically shown in FIG. 4 or 5, having an internal volume V of more than three litres, especially more than 5 litres, for example an internal volume between 8 and 40 litres. Examples can be containers 20 having substantially a bottle or barrel shape with an internal volume of about 10, 20 or 30 litres, such as for example about 17 litres. A preform assembly preferably has a neck area having an internal opening 21 with a cross sectional dimension D of about 25 mm or more, preferably about 49 mm or more, if it is substantially circular, or an equivalent cross sectional area of about 490 $mm^2$ or more, preferably about 1180 $mm^2$ or more. In an embodiment the cross sectional dimension D can be about 49.2 mm. A cross sectional dimension D has to be understood as measured perpendicular to a longitudinal axis L of the preform, measured near a free edge 22, 25 of the relevant neck portion 7 or 9, or the neck 4. In a preferred embodiment the opening 21 can have a substantially circular cross section perpendicular to said longitudinal axis, which can have said cross sectional dimension, defined by the diameter. The cross sectional dimension can decrease slightly in the direction of the body forming portion 4. The wall of the first preform 2 can for example have a cylindrical inner surface with a diameter $D_w$ at the side of the body 5 of some millimetres less than the said cross sectional dimension D. The diameter $D_w$ can for example be between 0 and 5% less. In an embodiment the cross sectional dimension of the opening 21 can be about 49 mm and the diameter $D_w$ at the body forming portion of the first preform 2 can be about 48 mm. Obviously other sizes, shapes and dimensions are possible. A relatively large cross section of the neck can have the advantage of a preferable stretch ratio of the body for relatively large volume containers, such as having an inner volume V of about 10 litres or more. A relatively large neck also can provide space for a standard tapping rod or at least for a tapping rod or valve assembly allowing connection of a standard tapping head such as for a Sankey two or three lug or flat head tapping head.

By way of example, for a container 20 having an internal volume V the first and second preforms 2, 3 and containers blow moulded there from can have dimensions as shown in the table 1 below, for crystallizing plastic, such as especially PET, more especially standard PET.

TABLE 1

| volume | 10 L | | | 20 L | | | 30 L | | |
|---|---|---|---|---|---|---|---|---|---|
| finish diameter D [mm] | 54 | | | 54 | | | 54 | | |
| midwall diameter preform [mm] | 56.1 | | | 56.1 | | | 63.4 | | |
| bottle diameter [mm] | 234.5 | | | 234.2 | | | 269 | | |
| preform length [mm] | 113 | | | 208 | | | 239 | | |
| bottle height [mm] | 282.5 | | | 520.8 | | | 593.2 | | |
| | range | | target | range | | target | range | | target |
| planar stretch ratio[1] | 9.00 | 12.00 | 10.45 | 9.00 | 12.00 | 10.45 | 9.00 | 12.00 | 10.53 |
| axial stretch ratio[2] | 2.20 | 2.80 | 2.50 | 2.20 | 2.80 | 2.50 | 2.20 | 2.80 | 2.48 |
| hoop stretch ratio | 3.21 | 5.45 | 4.18 | 3.21 | 5.45 | 4.17 | 3.21 | 5.45 | 4.24 |

Wherein:
axial stretch ratio=bottle height $L_B$/preform length $L_P$
hoop stretch ratio=bottle diameter $D_B$/midwall diameter $D_P$
planar stretch ratio=axial stretch ratio*hoop stretch ratio
Volume=container inner volume V
Finish diameter=inner diameter D of the neck portion
Mid wall diameter=diameter of the body of the preform assembly measured over the middle of the thickness of the relevant wall, preferably at the interface between the two preforms
Preform length=length Lp of the preform which is substantially stretch blow moulded, preferably measured from directly below a flange closest to the body to an apex of the bottom forming portion of the preform assembly.
Bottle diameter=average diameter of the body between a shoulder and a bottom
Bottle height=length Lb of the container which is substantially stretch blow moulded, preferably measured from directly below a flange closest to the body to an apex of the bottom.
All as for example shown in FIG. 6.

A planar stretch ratio is also known as Blow Up Ratio or BUR. The axial stretch ratio preferably is at least greater than 1.7. The axial stretch length of the preform and height of the container can be defined as the maximum axial distance between the inside of the bottom forming portion and the part of the neck where stretching is initiated.

In table 1 a range for a planar stretch ratio is given, which is preferred, for each of the preform/container combinations disclosed. The minimum ratio is preferred for mechanical stability and resistance to migration of $CO_2$ and/or $O_2$ in containers for holding carbonated beverages. The maximum preferred planar ratio is defined by the PET material itself. A preferred ratio is given as target.

In table 1 a range for an axial stretch ratio is given, which is preferred, for each of the preform/container combinations disclosed. The minimum ratio is preferred for even wall distribution, specifically an even wall thickness for the wall of the body of the container, especially between the shoulder and the bottom. The maximum preferred axial stretch ratio is defined experience obtained in the prior art. A preferred ratio is given as target.

It has been recognised in this description that the cooling of preform is essential to preventing crystallisation of the plastics material, meaning that the cooling has to be regulated such that the preform or preforms are kept substantially amorph. Cooling time is defined by:
1. wall thickness, especially maximum wall thickness of the preform
2. Injection temperature of the plastics material
3. Mould wall temperature, especially average mould wall temperature at injection
4. Ejection temperature plastic material
5. Heat conductive coefficient plastic material.

For containers for carbonated beverages such as beer and soft-drinks, having a relatively large volume, such as above 10 liters, the hoop ratio is most important and is preferably above 10.

The cooling time is dependant on the wall thickness, especially the maximum wall thickness squared (wall thickness to the power of two).

It has been recognised that the cooling time should be short enough to prevent orientation of the molecules in the wall of the preform or preforms. With preforms having a wall thickness of more than 8 mm, more specifically more than 6 mm the heat transfer from the plastic to the mould is insufficient to prevent such orientation in standard plastics, especially in standard PET. Even lowering the mould temperature has proven to be insufficient with thicker walls in preforms. Crystalline plastics, especially PET occurs in three states:
Amorphous, non-orientated and translucent, clear if not coloured;
Thermally crystallized, that is by means of relative slow cooking down of the melted material; and
Strain-induced crystallized, such as in stretch blow moulding.

In the present description the preforms are preferably injection moulded from crystallizing plastic, especially PET such as standard PET, with such wall thickness that the second state is prevented.

In FIG. 2 an embodiment of a preform assembly 1 is shown, in which a space 31 is provided between the first and second preform 2, 3, extending between at least part of the body forming portions 8, 10 of the preforms 2, 3. Spacers 32 can extend in said space keeping the inner and outer preforms at least partly spaced apart. In this embodiment the space 31 is closed off to the environment at the neck 4, especially at the free edge 23 of the first preform. In an embodiment a medium such as a fluid or gas, for example an inert gas such as $N_2$ or a gas as $CO_2$ is inserted in the space 31. When blow moulding a container 20 from the assembly 1 the medium in the space 31 may be pressurised, thereby strengthening the container 20. This can have the advantage that a reduced wall thickness can be used for at least one of the layers 2A, 3A, without compromising the strength of the container. In an embodiment an opening 40 can be provided, for example in the neck 4, opening into the space 31, which opening can be closed off by a valve or seal 41. This opening 40 can be opened, for example by opening the valve or piercing the seal 41. The opening can be or can be brought into communication with the environment, such that when opening the opening pressure in the space can be brought back to atmospheric pressure or at least can be reduced. In an embodiment the space 31 can be brought to under pressure. By reducing the pressure the container 20 or at least the body 5 thereof can be reduced in stiffness, allowing more easy compression, for example in a pressure space of a dispensing device as described here above, for dispensing the content of the container 20, or after it has been emptied to a desired degree, in order to reduce the volume of the empty container which has to be discarded or returned for recycling. This can have important benefits for the environment.

FIG. 3 schematically shows a preform assembly 1 in a further embodiment, in which a preform assembly of at least a first and second preform 2, 3 is inserted into a third preform 43 or a third preform is inserted into the first preform, preferably with a wall thickness W7 smaller than the wall thicknesses W1, W2 of the first and second preforms 2, 3. When blow moulding this preform assembly 1 into a container 20, it will have three layers 2A, 3A, 41A, as is shown in FIG. 5. The inner layer preferably is highly flexible compared to at least one of the other layers 2, 3 or the other layers 2, 3 combined. The layer 41A can enclose the beverage and can easily deform when pressurising the beverage. In an embodiment an assembly 1 having a neck 4 as shown in FIG. 1A or 8 can be used, wherein opening 30 can be provided as discussed earlier, in the neck area of the inner most preform 43, opening into a space between the inner most layer 41A and the first layer 2A, which will lie against the inside of the second layer 3A in a manner as described here before. In this embodiment a pressure fluid can be brought into a space 31 between the inner most, third layer 41A and the first layer 2A, wherein the first and second layers 2A, 3A can in an embodiment form a relatively rigid, pressure resistant outer container. By feeding pressurised fluid, such as gas, for example air or an inert gas into the space 31 the inner most layer 41A of a container 20 as shown in FIG. 5, blown from such preform assembly 1, will deform, pressurising the beverage therein. This means that beverage can be dispensed through the dispense opening 34 and/or valve 35 under pressure.

The space 31 can be replaced or augmented by a coating or layer provided on the interface between the first and second preform, over for example the body forming portions thereof or part thereof. The coating or layer can for example be a layer having barrier properties, for example preventing migration of gas into or out of the inner volume V. The coating or layer can for example prevent coupling of the first and second preform or wall part of the container, or can promote such coupling. The layer or coating can provide colouring, can prevent or enhance heat transport through the interface between the preforms, can be a layer preventing explosion of the container, such as for example but not limited to netting, layering or such means.

In embodiments of preforms and containers such protective layer can for example be but is not limited to a layer comprising or consisting of an impact resistance enhancing material, such as but not limited to polyvinylbutyral. In an embodiment the layer can be formed between the preforms 2, 3 and/or layers 2A, 3A of the container by applying the material in a dissolved state, for example in but not limited to ethanol, such that after forming the preform assembly 1 and/or the container 2 is will set by disappearance of or reaction with the solvent and/or the plastics materials of one or both of the adjacent preforms 2, 3 or layers 2A, 3A of the container 20. In another embodiment the layer can be provided on one or both of the preforms, preferably on at least one of adjacent surfaces, for example by co-injection or co-extrusion, and can then be stretch blow molded with the preform assembly 1. The layer can also be provided on an outer side of the outer preform and/or on an outer side of the container 20. Cross linkers can be added to the material of the layer, such as the polyvinylbutyral, for enhancing mechanical properties thereof.

A preform assembly 1 for blow moulding a container 20 can comprise injection moulding a first preform 2 and a second preform 3, preferably both with a wall thickness of less than about 8 mm, more preferably less then about 6 mm. The first preform 2 can be inserted into the second preform 3 and/or the second preform 3 can be provided over the first preform 2. In an embodiment the first 2 and second preform 3 can be injection moulded in an injection moulding apparatus, wherein the first preform 2 is inserted into the second preform 3 within said injection moulded apparatus. In another embodiment the first 2 and second preform 3 can be injection moulded in an injection apparatus, wherein the second preform 3 can be provided over the first preform 2 within said injection moulded apparatus. In still another embodiment the first preform 2 can be injection moulded within the second preform 3. In a further alternative embodiment the second preform 3 can be injection moulded over the first preform 4. In another alternative embodiment the preforms 2, 3 can be injection moulded, where after the preforms are assembled outside the or each injection moulding apparatus. In such embodiment the preforms 2, 3 can be shipped separately to an assembling system, for example near or in line with a blow moulding apparatus and/or a bottling apparatus or line, wherein the preforms can be assembled directly before bottling beverage. In such embodiment one or both of the preforms can be heated separately and assembled in heated condition.

Using different preforms assembled into one assembly prior to blow moulding, especially stretch blow moulding integrally, the safety can be improved, especially for carbonated beverages, since one of the preforms can be blown into a container part able to resist high pressure, whereas the other can be designed for optimal beverage containing. In another embodiment safety means can be included between the preforms, such as a safety layer, for example glued to one or both of the preforms and/or walls of the body of the container.

In embodiments of the description the neck portion 8 of the first, inner preform 2 can extend into the neck 9 of the second preform 3 only to such extend that part of the inner surface of the neck portion 9 of the outer, second preform 3 lies free above the neck portion 8 of the inner preform 2. A lid 33 can therein for example be connected to the inner surface of the second preform 9 within the neck. If present a space 31 can be accessible from within the neck.

The invention is by no means limited to the embodiments described and shown. Many variations are possible with the scope of the invention claimed, including combinations and equivalents of different elements of these embodiments, which are also deemed to have been disclosed.

For example, a preform assembly can be provided with more than two preforms, whereas different protective layers can be provided on parts of or entire surfaces of one or more of the preforms, for example but not limited to barrier layers and/or netting and/or a sleeve for preventing bulging of the container. Different volumes can be provided by amendments to the preforms, whereas the first preform can be made smaller, for example shorter in length, measured along the longitudinal axis L, such that the bottom portion is distanced from that of the second preform, meaning that the first preform will be stretched first, before stretching the second preform too. In case of a compressible container the pressure for compression can be exerted in a different manner, such as but not limited to mechanical or chemical compression means. Other materials can be used, whereas the preforms can be combined in a different manner, such as but not limited to by hand or by robot outside an injection moulding apparatus. An inner liner, deformable layer or deformable container can be provided within a two or more layered container as a separate element.

These and other, similar amendments can be made to containers, preforms, preform assemblies and/or methods within the scope of the present invention.

The invention claimed is:

1. A preform comprising a first preform in a second preform, wherein the preform comprises a neck which comprises a neck portion of the first preform and a neck portion of the second preform, wherein one or more openings are provided in the neck portion, extending through a wall portion of the neck portion of the first preform.

2. The preform according to claim 1, wherein the preform is a preform assembly, wherein the first preform has a body forming portion having a wall spaced apart from a wall of a body forming portion of the second preform.

3. The preform according to claim 1, wherein the at least one opening is provided below an end of the first preform.

4. The preform according to claim 1, wherein the at least one opening opens into a space between the neck forming portion of the first preform and the neck forming portion of the second preform.

5. The preform according to claim 4, wherein said space is provided with spacers extending between the neck forming portions.

6. The preform according to claim 5, wherein the spacers extend into a shoulder forming portion of the preform.

7. The preform according to claim 1, wherein a lid is provided in and/or on the preform, closing off at least a space between the first preform and the second preform, above the at least one opening.

8. The preform according to claim 7, wherein the lid is connected to the preform by welding, gluing or press fit.

9. The preform according to claim 1, wherein a lid is provided in and/or on the preform, connected to the neck portion of the first preform and the neck portion of the second preform.

10. The preform according to claim 9, wherein the lid is connected to the preform by welding, gluing or press fit.

11. A container blow moulded from the preform according to claim 1.

12. A preform assembly comprising an first, inner preform and a second, outer preform, wherein the preform assembly comprises a neck portion of the first preform and a neck portion of the second preform, wherein one or more openings are provided in the preform assembly through a wall of the neck portion of the inner preform.

13. The preform assembly according to claim 12, wherein a lid is provided in and/or on the preform, closing off at least a space between the first preform and the second preform, above the at least one opening.

14. The preform assembly according to claim 13, wherein the lid comprises a central opening, opening into an inner volume of the first preform.

15. The preform assembly according to claim 14, wherein the lid is connected to the preform by welding, gluing or press fit.

16. The preform assembly according to claim 13, wherein the lid is connected to the preform by welding, gluing or press fit.

17. The preform assembly according to claim 12, wherein a lid is provided in and/or on the preform, connected to the neck portion of the first preform and the neck portion of the second preform.

18. The preform assembly according to claim 17, wherein the lid is connected to the preform by welding, gluing or press fit.

19. The preform assembly according to claim 12, for blow moulding a container, wherein the first preform is positioned inside the second preform before blow moulding the preforms into the container, wherein each preform has a body forming portion having a wall thickness of less than about 8 millimetres.

20. The preform assembly according to claim 19, wherein each preform has a body forming portion having a wall thickness of less than about 6 mm.

21. The preform assembly according to claim 20, wherein the wall thickness of the body forming portion of the first preform is smaller than the wall thickness of the body forming portion of the second preform.

22. The preform assembly according to claim 12, wherein at least the first preform has a neck portion connected to the body portion, wherein the neck portion has an inner diameter of more than 25 millimetres or an internal cross section of more than 490 mm$^2$.

23. The preform assembly according to claim 22, wherein the neck portion has an inner diameter of more than 48 mm or an internal cross section of more than 980 mm$^2$.

24. The preform assembly according to claim 12, wherein the first preform has a neck portion fitted inside the neck portion of the second preform.

25. The preform assembly according to claim 12, wherein at least part of the neck portion of the second preform has been crimped onto the neck portion of the first preform.

26. The preform assembly according to claim 12, wherein one of the first and second preform comprises a scavenger for $O_2$, and/or wherein one of the first and second preform comprises a colorant.

27. The preform assembly according to claim 26, wherein one of the two preforms comprises the scavenger and the other of the two preforms comprises a colorant.

28. The preform assembly according claim 12, wherein a space is provided between body forming portions of the first and second preform.

29. The preform assembly according to claim 28, wherein the space is or can be closed off to the environment.

30. The preform assembly according to claim 12, wherein at least one of the first and second preform is made of standard PET.

31. The preform assembly according to claim 30, wherein the or each preform made of standard PET is free of anti-crystallisation additives.

32. The preform assembly according to claim 12, wherein the first and second preform have been injection moulded.

33. The preform assembly according to claim 32, wherein the at least one opening has been formed during injection moulding of the relevant preform.

34. A set of the preform assembly according to claim 12 and a container blow moulded from such preform assembly, the container being a bag-in-container type container comprising an inner container and an outer container, wherein:
the container has a neck portion comprising:
a first neck portion of the inner container, said first neck portion formed by the neck forming portion of the first preform; and
a second neck portion of the outer container, said second neck portion formed by a neck portion of the second preform,
wherein:
the first neck portion is substantially identical to the neck forming portion of the first preform; and
the second neck portion is substantially identical to the neck forming portion of the second preform.

35. A container blow moulded from the preform assembly according to claim 12.

36. A method for forming a preform assembly for blow moulding a container, wherein a first preform is injection moulded and a second preform is injection moulded, wherein the first preform is inserted into the second preform and/or the second preform is provided over the first preform, wherein during injection moulding at least one opening is formed extending through a wall of a neck portion of the first or second preform.

37. The method according to claim 36, wherein:
the first and second preform are injection moulded in an injection apparatus and wherein the first preform is inserted into the second preform within said injection moulded apparatus; or
the first and second preform are injection moulded in an injection apparatus and wherein the second preform is provided over the first preform within said injection moulded apparatus; or
the first preform is injection moulded within the second preform; or
the second preform is injection moulded over the first preform.

38. The method according to claim 36, wherein a lid is provided, interconnecting the first and second preform, prior to positioning of the preform assembly in a blow moulding mould.

39. The method according to claim 36, wherein the second preform is injection molded without providing an opening in a bottom forming portion.

40. A preform assembly comprising a first preform extending at least partly into a second preform, wherein the first preform comprises a first neck portion and the second preform comprises a second neck portion, the second neck portion surrounding the first neck portion at least partly, wherein one or more openings are provided through a wall of the first neck portion or through a wall of the second neck portion, wherein the at least one opening opens into a space between the first neck forming portion and the second neck forming portion, wherein said space is provided with and/or by spacers extending between at least part of the first and second neck forming portions and between at least part of shoulder forming portions of the preforms adjacent to said neck forming portions.

41. The preform assembly according to claim 40, wherein a lid is provided in and/or on the preform assembly, closing off at least said space, above the at least one opening, wherein the lid comprises a central opening, opening into an inner volume of the first preform.

42. The preform assembly according to claim 41, wherein the lid is connected to the preform by welding, gluing or press fit.

43. A preform assembly for blow moulding a bag in container, comprising a first preform extending at least partly into a second preform, wherein the first preform comprises a first neck portion and the second preform comprises a second neck portion, the second neck portion surrounding the first neck portion at least partly, wherein one or more openings are provided, wherein the at least one opening opens into a space between the first neck forming portion and the second neck forming portion, wherein said space is provided with and/or by spacers extending between at least part of the first and second neck forming portions,
wherein a lid is provided for press fitting over the neck portion of the outer container formed from the preform assembly, said lid comprising an opening which opens into an inner volume of the inner container and a gas inlet opening which opens into said at least one opening in fluid connection with said space, said lid closing off said space.

44. A bag in container blow moulded from a preform assembly comprising a first preform extending at least partly into a second preform, wherein the first preform comprises a first neck portion and the second preform comprises a second neck portion, the second neck portion surrounding the first neck portion at least partly, wherein one or more openings are provided, wherein the at least one opening opens into a space between the first neck forming portion and the second neck forming portion, wherein said space is provided with and/or by spacers extending between at least part of the first and second neck forming portions, wherein an inner container or bag of the bag in container is formed of the first preform and an outer container of the bag in container is formed from the second preform, wherein the space between the inner and outer preforms is still provided in said container, comprising at least said spacers,
wherein a lid is provided press fitted over the neck portion of the outer container formed from the preform assembly, said lid comprising an opening which opens into an inner volume of the inner container and a gas inlet opening which opens into said at least one opening in fluid connection with said space, and wherein said lid is connected with an upper edge of the inner container, sealing off said space against the inner volume of the inner container.

45. A bag in container blow moulded from a preform assembly,
wherein an inner container or bag of the bag in container is formed of a first preform and an outer container of the bag in container is formed from the second preform, wherein between first and second neck forming portions of the inner container and outer container a space is provided, comprising and/or formed by spacers extending between at least part of the first and second neck forming portions,
wherein a lid is provided press fitted over the neck portion of the outer container, said lid comprising an opening which opens into an inner volume of the inner container for dispensing a carbonated beverage from said inner container and a gas inlet opening which opens into at least one opening in fluid connection with said space, and wherein said lid is connected with an upper edge of the inner container, sealing off said space against the inner volume of the inner container.

46. The bag in container according to claim 45, wherein the inner volume of the bag is filled with beer.

47. The bag in container according to claim 46, wherein the inner and outer container are made of PET or a PET blend, wherein at least one of the inner container and the outer container comprises a gas migration limiting or preventing additive and/or a scavenger.

48. The bag in container according to claim 46, wherein the inner and outer container are made of PET or a PET blend, wherein the inner container comprises a colorant and the outer container comprises a gas migration limiting or preventing additive and/or a scavenger or wherein the outer container comprises a colorant and the inner container comprises a gas migration limiting or preventing additive and/or a scavenger.

49. The bag in container according to claim 45, wherein the lid seals against the outer container and against an upper edge of the neck portion of the inner container, such that the space is closed by said lid.

50. The bag in container according to claim 45, wherein the inner and outer container are made of PET or a PET blend, wherein at least one of the inner container and the outer container comprises a colorant.

* * * * *